D. BRASILL & D. A. MULLANE.
BONE BLACK EQUALIZER.
No. 93,668. Patented Aug. 17, 1869.
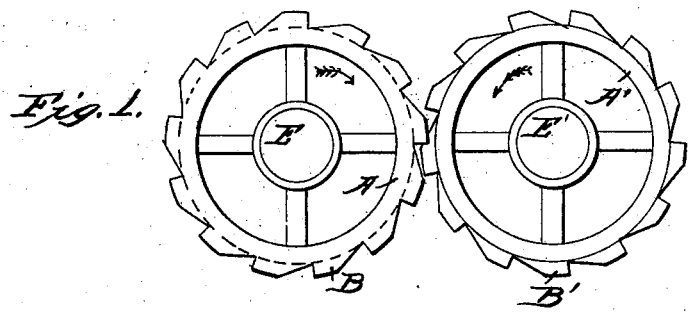
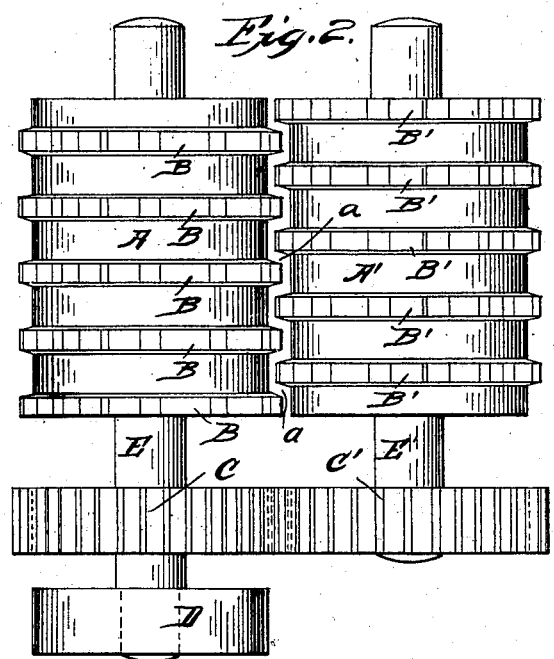
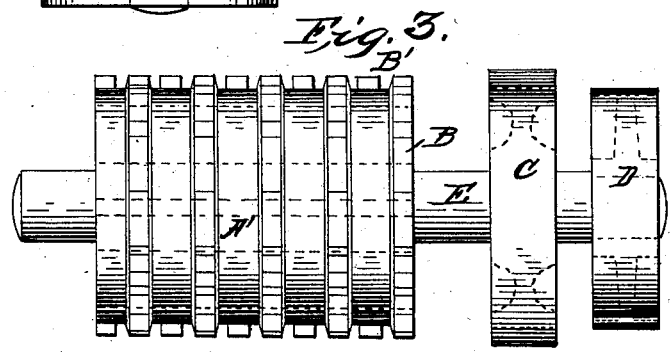

United States Patent Office.

DANIEL BRASILL AND D. A. MULLANE, OF NEW ORLEANS, LOUISIANA.

Letters Patent No. 93,668, dated August 17, 1869.

IMPROVED BONE-BLACK EQUALIZER.

The Schedule referred to in these Letters Patent and making part of the same

*To all whom it may concern:*

Be it known that we, DANIEL BRASILL and D. A. MULLANE, of the city of New Orleans, and State of Louisiana, have invented, jointly, a certain new and useful improvement in machines technically known as "Bone-Black Equalizers;" and we do hereby declare the following to be a full, clear, and exact description of the same, reference being had to the annexed drawing, making a part of this specification, on which—

Figure 1 is an end,
Figure 2, a top or plan, and
Figure 3, a side view thereof.

The particular design or object of our invention is to reduce or break up the bones, to be converted afterward into bone-black, in an effective manner, and in small pieces of about the same size, without pulverizing the same, and thus to avoid the well-known disadvantages which result from pulverization in the first stage of conversion; and Our invention consists of two cylinders or crushing-rollers, from the perimeters of which project five or more concentric rings of teeth, of peculiar form, so arranged or placed on such cylinder as to leave a zigzag open space, through which the bones to be broken up pass in the operation of the machine, of nearly equal width, everywhere from one end of the cylinders to the other.

But our invention will be better understood by referring to the drawing, on which five circumferential rings of teeth are shown on each of the cylinders.

A A' are the two cylinders. They are mounted and sustained in proper journals on a strong frame, not shown on the drawings, so as to be parallel to each other, as shown at fig. 2, and at such distance apart as to provide an open space between them, which, when diminished by the rings of teeth, will break up or reduce the bones to pieces, of the required or given size, as they pass through the same.

B B' are the teeth projecting from the respective cylinders, in such manner as to leave a zigzag open space, *a*, between the cylinders, which, throughout its whole extent, is very nearly of uniform width. These teeth, as shown at fig. 1, are formed not unlike saw-teeth with the points cut off, and they are placed reversely to each other on the two cylinders.

The cylinders are connected by means of the cog-gear wheels C C', fitted on their axes E E', which are extended, as shown at fig. 2, for this purpose, and motion is imparted to them through the agency of the band-pulley D, and any proper driving-power or motor.

The operation of our invention is very simple. The cylinders are put in motion, the rotation being in opposite directions, as indicated by the arrows, at fig. 1, and the bones being put between, are drawn through the opening *a*, and thoroughly broken to pieces. The teeth B B', it will be seen, are, by reason of their peculiar form, especially adapted to the purpose of drawing in and forcing the bones between the cylinders, and also, from their breadth on their faces, to the crushing or breaking of them as they pass through.

We have demonstrated the efficiency of our machine by actual experiment, and have now a full-sized working machine in successful operation.

What we claim, and desire to secure by Letters Patent, is—

The cylinders A A', when provided with the circumferential circles of saw-like teeth B B', so adjusted as to create the zigzag opening *a* between the cylinders, and the machine is otherwise constructed and arranged, substantially as herein described for the purpose set forth.

DANIEL BRASILL.
D. A. MULLANE.

Witnesses:
RUFUS R. RHODES,
E. TOMATIS.